United States Patent
Yamashita

(10) Patent No.: US 12,111,598 B2
(45) Date of Patent: *Oct. 8, 2024

(54) IMAGE GENERATOR AND IMAGE GENERATION METHOD

(71) Applicant: KONICA MINOLTA, INC., Tokyo (JP)

(72) Inventor: Takashi Yamashita, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 17/740,944

(22) Filed: May 10, 2022

(65) Prior Publication Data

US 2022/0334528 A1 Oct. 20, 2022

Related U.S. Application Data

(63) Continuation of application No. 15/964,470, filed on Apr. 27, 2018, now Pat. No. 11,353,818.

(30) Foreign Application Priority Data

May 12, 2017 (JP) ................. 2017-095483

(51) Int. Cl.
*G03G 15/00* (2006.01)
*G03G 21/00* (2006.01)
*G03G 21/14* (2006.01)

(52) U.S. Cl.
CPC ....... *G03G 15/703* (2013.01); *G03G 15/5012* (2013.01); *G03G 15/502* (2013.01); *G03G 15/5062* (2013.01)

(58) Field of Classification Search
CPC .... G03G 15/00; G03G 15/23; G03G 15/5012; G03G 15/502; G03G 15/5062; G03G 15/703; G03G 21/00; G03G 21/14
See application file for complete search history.

(56) References Cited

U.S. PATENT DOCUMENTS 5,655,759 A  8/1997  Perkins et al.
5,684,934 A  11/1997  Chen et al.
(Continued)

FOREIGN PATENT DOCUMENTS

JP  H09237168 A  9/1997
JP  2000057130 A  2/2000
(Continued)

OTHER PUBLICATIONS

Notice of Reasons for Refusal issued on Aug. 30, 2022, by the Japanese Patent Office in corresponding Japanese Patent Application No. 2021-134223 and an English translation of the Notice. (12 pages).

(Continued)

*Primary Examiner* — Nguyen Q. Ha
(74) *Attorney, Agent, or Firm* — Buchanan Ingersoll & Rooney PC

(57) ABSTRACT

There is a need to provide an image generator and an image generation method capable of avoiding wasting a normal printed matter if any in sheets of paper output after an occurrence of waste paper. When paper contains an abnormal image, the paper is detected as waste paper based on a read result from an image read sensor. Detection of the waste paper allows an image generator to perform reprint from a print job for the waste paper. Normal-image paper may be contained in sheets of paper output between detection of the waste paper and the reprint to be performed. In this case, the normal-image paper is used as a normal printed matter and is avoided from being consumed wastefully.

21 Claims, 10 Drawing Sheets

(56) References Cited

U.S. PATENT DOCUMENTS

| | | |
|---|---|---|
| 6,224,048 B1 | 5/2001 | Motamed |
| 6,236,450 B1 | 5/2001 | Ogura |
| 6,388,760 B2 | 5/2002 | Kadota et al. |
| 6,661,978 B2 | 12/2003 | Brewington |
| 9,235,790 B2 | 1/2016 | Hiramatsu et al. |
| 2005/0168767 A1 | 8/2005 | Moroney et al. |
| 2011/0049784 A1 | 3/2011 | Mandel et al. |
| 2012/0257917 A1 | 10/2012 | Bockus et al. |
| 2012/0263483 A1 | 10/2012 | Suzuki |
| 2013/0141750 A1 | 6/2013 | Suzuki |
| 2016/0004943 A1 | 1/2016 | Asai et al. |
| 2017/0082963 A1 | 3/2017 | Tsue |
| 2018/0329352 A1 | 11/2018 | Yamashita |

FOREIGN PATENT DOCUMENTS

| | | |
|---|---|---|
| JP | 2008122466 A | 5/2008 |
| JP | 2010002463 A | 1/2010 |
| JP | 2011-137736 A | 7/2011 |
| JP | 2012-111200 A | 6/2012 |
| JP | 2013114246 A | 6/2013 |
| JP | 2014144627 A | 8/2014 |
| JP | 2015120264 A | 7/2015 |
| JP | 2016015627 A | 1/2016 |

OTHER PUBLICATIONS

Office Action (Notice of Reasons for Refusal) issued on Sep. 14, 2021, by the Japanese Patent Office in corresponding Japanese Patent Application No. 2017-095483, and an English Translation of the Office Action, 32 pages.

Decision of Dismissal of Amendment issued on Mar. 15, 2022, by the Japanese Patent Office in corresponding Japanese Patent Application No. 2017-095483 and an English translation of the Decision, 10 pages.

Notice of Reasons for Refusal issued on Mar. 2, 2021, by the Japanese Patent Office in corresponding Japanese Patent Application No. 2017-095483 and an English translation of the Notice, 17 pages.

IMAGE GENERATOR AND IMAGE GENERATION METHOD

CROSS-REFERENCE TO RELATED APPLICATIONS

This application is a continuation of U.S. patent application Ser. No. 15/964,470, filed on Apr. 27, 2018, which claims benefit of Japanese Patent Application No. 2017-95483, filed on May 12, 2017, the entire contents of which are hereby incorporated by reference for all purposes.

BACKGROUND

There is widely used an electrophotographic image generator that transfers a toner image formed on a photoreceptor to paper as an example of recording media and fixes the toner image to the paper by allowing a high-temperature fixer to heat and pressurize the paper where the toner image is transferred. The electrophotographic image generator is used for copiers, printers, facsimile machines, printing machines, and combined machines.

This type of image generators may chronologically contaminate the fixer due to toner or may apply toner to the fixer due to a paper jam. In such a state, the toner on the fixer adheres to the paper and contaminates the paper when the paper passes through the fixer. The paper contaminated by the adhered toner is handled as so-called waste paper (spoilage paper). In duplex printing, image formation positions may be misaligned or the image density may chronologically vary. These misaligned positions or image density variations may degrade the print quality as an unsuccessfully printed image depending on the extent of the issue. In this case, the output paper is also handled as waste paper.

The technology described in Patent Literature 1 copes with the occurrence of an unsuccessfully printed image (waste paper). As described in Patent Literature 1, "the image generator continues a print job in progress at the time of a failure determination and stops the print operation after the print job in progress terminates. After a failure is determined, the image generator inspects a printed image generated by the print job in progress. No failure may be determined after the first failure is determined. In such a case, the failure can be determined to be accidental, not an anomaly in the image generator."

TECHNOLOGICAL FIELD

The present invention relates to an image generator and an image generation method and more particularly to an electrophotographic image generator and an image generation method.

DESCRIPTION OF THE RELATED ART

Patent Literature 1: JP 2008-122466 A

SUMMARY

A print job stops when the waste paper occurs. A user is requested to remove the waste paper. A restart instruction restarts printing from the print job corresponding to the waste paper (recovery operation). When continuous printing successively prints a plurality of print jobs, the printing is also performed on a plurality of sheets subsequent to the waste paper during a period in which the waste paper occurs, and then the job stops. These sheets of paper are also ejected along with the waste paper to a catch tray.

The recovery operation restarts printing from the job that causes the waste paper. In this case, the recovery operation is also performed on the sheets subsequent to the paper that requires the recovery operation. The recovery operation therefore prints and outputs the same images as those on the sheets of paper output during the period in which the waste paper occurs, and then the job stops. Suppose the sheets of paper provide normally printed matters and are output subsequently to the waste paper during the period in which the waste paper occurs, and then the job stops. The sheets of paper are then wasted.

It is therefore an object of the present invention to provide an image generator and an image generation method capable of avoiding wasting a normal printed matter if any in sheets of paper output after an occurrence of waste paper.

To achieve the above-mentioned object, according to an aspect of the present invention, an image generator reflecting one aspect of the present invention includes: an image read sensor that reads an image from paper where the image is formed; a waste paper detector that detects paper as waste paper based on a read result from the image read sensor when an image on the paper is abnormal; and a controller that provides control to perform reprint from a print job for the waste paper when the waste paper detector detects the waste paper. Normal-image paper may be included in paper output between detection of the waste paper and the reprint to be performed. In this case, the controller of the image generator performs control to use the normal-image paper as a normal printed matter.

An image generation method reflecting another aspect of the present invention is applicable to an image generator that includes: an image read sensor that reads an image from paper where the image is formed; and a waste paper detector that detects paper as waste paper based on a read result from the image read sensor when an image on the paper is abnormal. Reprint is performed from a print job for the waste paper when the waste paper detector detects the waste paper. Normal-image paper may be included in paper output between detection of the waste paper and the reprint to be performed. In this case, the normal-image paper is used as a normal printed matter.

The image generator or the image generation method configured above does not discard normal-image paper (normal printed matter) if contained in paper output between detection of the waste paper and the reprint to be performed, uses the normal-image paper as a normal printed matter, and avoid the normal-image paper output after an occurrence of the waste paper from being consumed wastefully.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
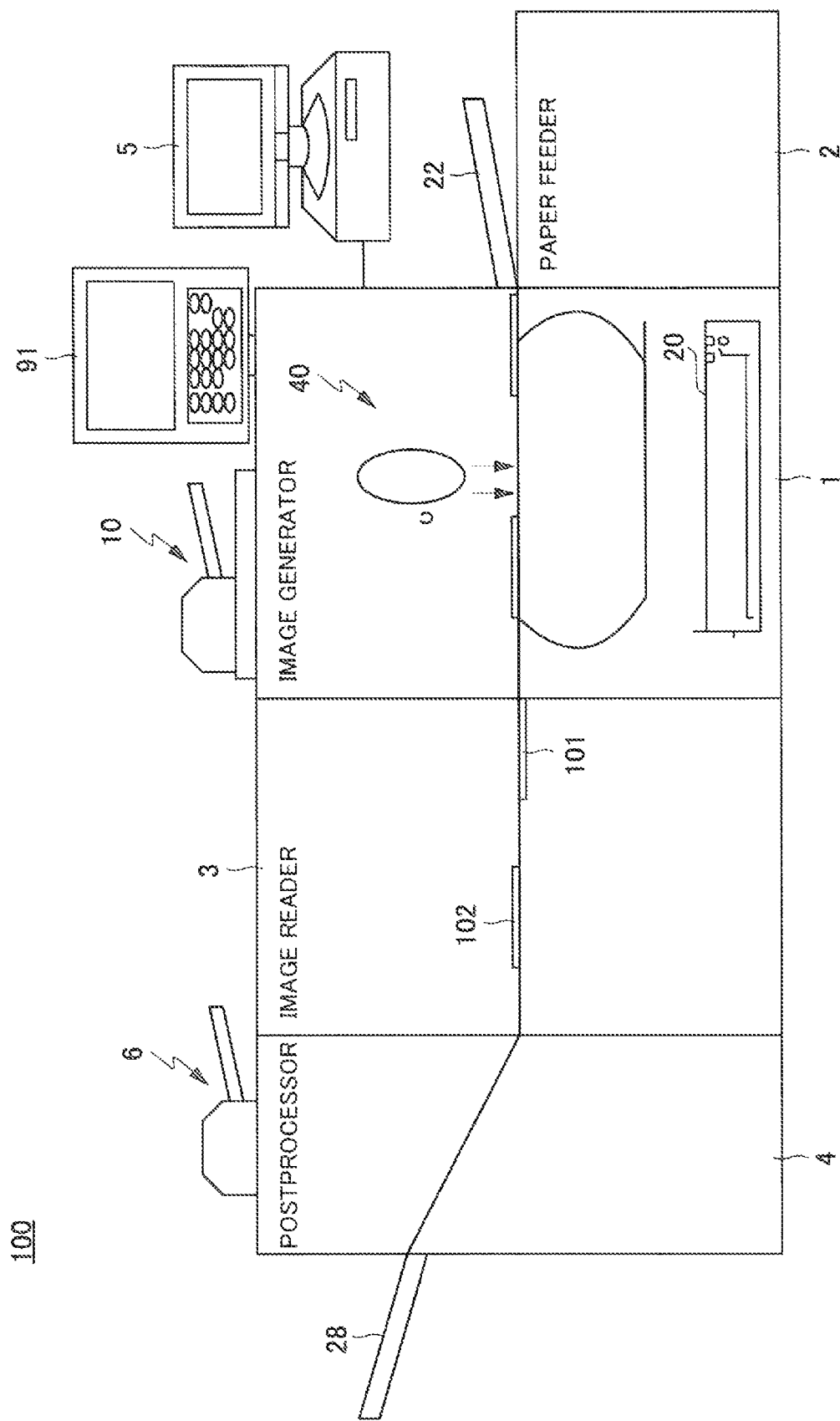
FIG. 1 is a system configuration diagram illustrating a schematic configuration of an image generation system to which the present invention is applied.

Hereinafter, one or more embodiments of the present invention will be described with reference to the drawings. However, the scope of the invention is not limited to the disclosed embodiments.

The description below explains in detail embodiments of the present invention with reference to the accompanying drawings. The present invention is not limited to the embodiments. The following description and the drawings use the same reference numeral for the same elements or elements having the same function. A duplicate description is omitted.

Image Generation System to which the Present Invention is Applied

FIG. 1 is a system configuration diagram illustrating a schematic configuration of an image generation system to which the present invention is applied. An image generation system 100 according to the present example of application includes an image generator 1, a paper feeder 2, an image reader 3, a postprocessor 4, and an external apparatus 5. The image generator 1 exemplifies the image generator according to the present invention and will be described in detail later with regard to the configuration.

The paper feeder 2 is provided outside the image generator 1 independently of a paper container 20 built in the image generator 1 and is available as a large-capacity paper feeder that supplies the image generator 1 with various types of recording media (such as paper).

The image reader 3 reads an image from a recording medium where the image generator 1 forms the image. The image reader 3 includes a first image read sensor 101 and a second image read sensor 102. The first image read sensor 101 reads an image on a first surface from a bottom surface of a recording medium, for example. The second image read sensor 102 reads an image on a second surface from a top surface of a recording medium, for example. The first image read sensor 101 and the second image read sensor 102 can each use an inline sensor including CCD or CMOS image sensors whose light-sensitive elements (image elements) are linearly positioned across at least the maximum width of a recording medium.

In this example, the first image read sensor 101 and the second image read sensor 102 of the image reader 3 are provided outside the image generator 1, but can be provided inside the image generator 1. In this example, the image generator 1 is configured for both side printing. In one-side printing, however, one of the first image read sensor 101 and the second image read sensor 102 is provided.

The postprocessor 4 performs post-processing such as stapling on a recording medium output from the image generator via the image reader 3. The top side of the postprocessor 4 is provided with a PI tray unit (paper insertion tray unit) 6 as a paper feed tray unit for insertion pages only. A user mounts predetermined paper on the PI tray unit 6. The predetermined paper mounted by the user on the PI tray unit 6 is fed to a paper path in the postprocessor 4 as needed during continuous printing under control of a controller 90 (see FIG. 3) described later and is output to a catch tray unit 28.

The external apparatus 5 includes a personal computer (PC), for example, and supplies image data to the image generator 1. The external apparatus 5 is exemplified by a personal computer here, but is not limited thereto, and is also applicable to a facsimile machine, for example, and other various apparatuses.

Overall Configuration of the Image Generator

Figure 2:
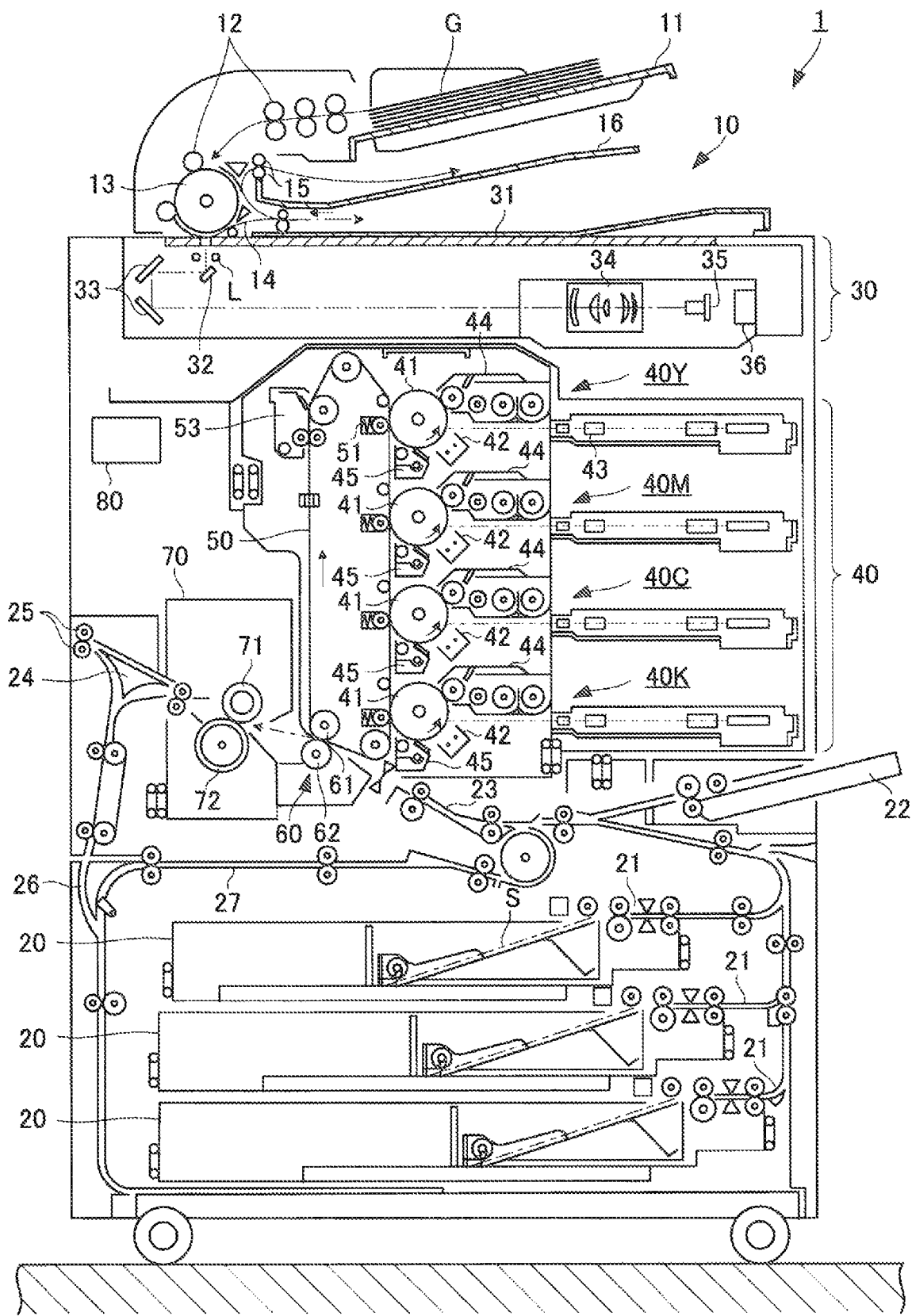
FIG. 2 is an overall configuration diagram illustrating a hardware configuration of parts included in an image generator according to an embodiment of the present invention.

An overall configuration of the image generator 1 will be described with reference to FIG. 2. FIG. 2 is an overall configuration diagram exemplifying a hardware configuration of parts of the image generator according to an embodiment of the present invention. The present embodiment describes an example of applying the image generator to a copier.

The image generator 1 according to the present embodiment employs an electrophotographic system to generate images by using static electricity and is available as a tandem color image generator overlaying four colors of toner such as yellow (Y), magenta (M), cyan (C), and black (K).

As illustrated in FIG. 2, the image generator 1 according to the present embodiment includes a document transporter 10, a paper container 20, an image reader 30, an image generator 40, an interim transfer belt 50, a secondary transferrer 60, a fixer 70, and a control board 80.

The image generator 1 according to the present embodiment further includes the first image read sensor 101 and the second image read sensor 102 as illustrated in FIG. 1. The first image read sensor 101 and the second image read sensor 102 are illustrated as being provided for the image reader 3 in FIG. 1, but are each represented as a constituent element of the image generator 1 here.

The document transporter 10 includes a document feed rack 11 to mount documents, a plurality of rollers 12, a transport drum 13, a transport guide 14, a document ejection roller 15, and a document ejection tray 16. The document feed rack 11 mounts document G. The rollers 12 and the transport drum 13 transport document G one sheet at a time to a read position for the image reader 30. The rollers 12 and the transport drum 13 transport document G as above. The transport guide 14 and the document ejection roller 15 eject document G to the document ejection tray 16.

A document is transported by the document transporter 10 as above or is mounted on a document rack 31. The image reader 30 reads an image of the document to generate image data. Specifically, lamp L irradiates light to an image of document G. The light irradiated from lamp L reflects off document G and is guided by a first mirror unit 32, a second mirror unit 33, and a lens unit 34 in this order, and forms an image on a light receiving surface of an imaging element 35. The imaging element 35 applies photoelectric conversion to the incident light to output a predetermined image signal. The image signal output from the imaging element 35 is A/D-converted to generate image data.

The image reader 30 includes an image processor 36. The image processor 36 applies known image processing such as shading correction, dithering, and compression to the image data generated from the A/D conversion in the image reader 30 and stores the image data in RAM 903 (see FIG. 3) of the controller 90 mounted on the control board 80. The image data is not limited to data output from the image reader 30 and may be received from an external apparatus such as a personal computer connected to the image generator 1 or from other image generators.

There are provided a plurality of the paper containers 20 depending on sizes or types of paper S exemplifying a recording medium and are placed at the bottom of the apparatus body. Paper S is fed by a paper feeder 21 and is delivered to a transporter 23. The transporter 23 transports paper S to the secondary transferrer 60 as a transfer position. A manual feeder 22 is provided near the paper container 20. A user mounts special paper from the manual feeder 22 that then delivers the special paper to the transfer position. The special paper includes paper of a size incapable of being fit to the paper container 20, tag paper having a tag, and OHP sheets.

The image generator 40 and the interim transfer belt 50 are placed between the image reader 30 and the paper container 20. The image generator 40 includes four image generation units 40Y, 40M, 40C, and 40K to generate toner images in colors such as yellow (Y), magenta (M), cyan (C), and black (K).

The image generation unit 40Y generates a yellow toner image. The image generation unit 40M generates a magenta toner image. The image generation unit 40C generates a cyan toner image. The image generation unit 40K generates a black toner image. The four image generation units 40Y, 40M, 40C, and 40K are equally configured. The description below explains the image generation unit 40Y generating yellow toner images.

The image generation unit 40Y includes a drum-shaped photoreceptor (photoreceptor drum) 41, a charger 42 placed around the photoreceptor 41, an exposer 43, a developing unit 44, and a first cleaner 45. The photoreceptor 41 is driven by an unshown drive motor to rotate. The charger 42 applies an electric charge to the photoreceptor 41 to evenly charge the surface of the photoreceptor 41. The exposer 43 forms an electrostatic latent image on the photoreceptor 41 by exposing the surface of the photoreceptor 41 based on image data read from document G or image data transmitted from an external apparatus.

The developing unit 44 develops an electrostatic latent image formed on the photoreceptor 41 by using a two-element developer including a toner and a carrier. The toner contains particles to form an image. The carrier includes such functions as allowing the frictional charging to supply the toner with an appropriate electric charge when mixed with the toner in the developing unit 44, transporting the toner to a development region facing the photoreceptor 41, and forming a development field so that the toner can be developed faithfully to an electrostatic latent image on the photoreceptor 41. The developing unit 44 transfers the yellow toner to the electrostatic latent image formed on the photoreceptor 41. A yellow toner image is thereby formed on the surface of the photoreceptor 41.

The developing unit 44 of the image generation unit 40M transfers the magenta toner to the photoreceptor 41 of the image generation unit 40M. The developing unit 44 of the image generation unit 40C transfers the cyan toner to the photoreceptor 41 of the image generation unit 40C. The developing unit 44 of the image generation unit 40K transfers the black toner to the photoreceptor 41 of the image generation unit 40K.

The first cleaner 45 cleans the surface of the photoreceptor 41 after the toner sticking to the photoreceptor 41 is transferred to the interim transfer belt 50. Specifically, the first cleaner 45 removes residues (accretions) such as the toner (residual toner) remaining on the surface of the photoreceptor 41.

The toner sticking to the photoreceptor 41 is transferred to the interim transfer belt 50. The interim transfer belt 50 is formed to be endless and is looped around a plurality of rollers. The interim transfer belt 50 is driven by an unshown drive motor to rotate counterclockwise opposite to the rotation direction of the photoreceptor 41. A primary transferrer 51 is provided for the interim transfer belt 50 at a position opposite to the photoreceptor 41 for each of the image generation units 40Y, 40M, 40C, and 40K.

The primary transferrer 51 applies a reverse polarity voltage, namely, a voltage having the polarity opposite to that of the toner, to the interim transfer belt 50 and thereby transfers the toner sticking to the photoreceptor 41 to the interim transfer belt 50. The interim transfer belt 50, when rotated, transfers the toner images formed by the four image generation units 40Y, 40M, 40C, and 40K in order to the surface of the interim transfer belt 50. The yellow, magenta, cyan, and black toner images overlap with each other to form a color image on the interim transfer belt 50.

A second cleaner 53 is provided opposite to the interim transfer belt 50. The second cleaner 53 cleans the surface of the interim transfer belt 50 after a toner image transferred to the interim transfer belt 50 is transferred to paper S. Specifically, the second cleaner 53 removes residues (accretions) such as the toner (residual toner) remaining on the surface of the interim transfer belt 50.

A secondary transferrer 60 is placed near the interim transfer belt 50 downstream of the paper transport direction for the transporter 23. The secondary transferrer 60 includes a transfer roller pair, namely, an upper transfer roller 61 looping the interim transfer belt 50 and a lower transfer roller 62 pressed against the upper transfer roller 61 to thread the interim transfer belt 50. Paper S transported by the transporter 23 is placed in contact with the interim transfer belt 50. A toner image formed on an outer periphery of the interim transfer belt 50 is transferred to paper S.

A fixer 70 is provided at a side of the secondary transferrer 60 where paper S is ejected. The fixer 70 presses and heats paper S to fix the transferred toner image to paper S. The fixer 70 includes a pair of fixing members, namely, an upper fixing roller 71 and a lower fixing roller 72, for example. The upper fixing roller 71 and the lower fixing roller 72 are positioned so as to be pressed against each other to form a fixer nipper as a presser between the upper fixing roller 71 and the lower fixing roller 72.

A heater is provided inside the upper fixing roller 71. Radiation heat from the heater heats a roller portion of the upper fixing roller 71. The heat from the roller portion of the upper fixing roller 71 is transferred to paper S to fix the toner image on paper S.

Paper S is transported by the secondary transferrer 60 so that the surface (targeted at fixing) containing the transported toner image faces the upper fixing roller 71. Paper S then passes through the fixer nipper. Paper S passing through the fixer nipper is therefore subject to pressing between the upper fixing roller 71 and the lower fixing roller 72 and heating by the heat from the roller portion of the upper fixing roller 71.

A changeover gate 24 is placed downstream of the fixer 70 in the transport direction of paper S. The switchover gate 24 changes the path for paper S passing through the fixer 70. The switchover gate 24 straight guides paper S when an image is formed on one side of paper S and paper S is ejected face up. A pair of paper ejection rollers 25 outputs paper S. The changeover gate 24 guides paper S downward when an image is formed on one side of paper S and paper S is ejected face down and an image is formed on both sides of paper S.

During the face-down ejection, the changeover gate 24 guides paper S downward, and then a paper reversal transporter 26 reverses both sides of paper S and transports paper S upward. Paper S having both sides reversed is output by a pair of paper ejection rollers 25. During image formation on both sides of paper S, the changeover gate 24 guides paper S downward, and then the paper reversal transporter 26 reverses both sides of paper S. Paper S having both sides reversed is transported to the transfer position through a re-feed path 27.

Configuration of a Control System for the Image Generator

Figure 3:
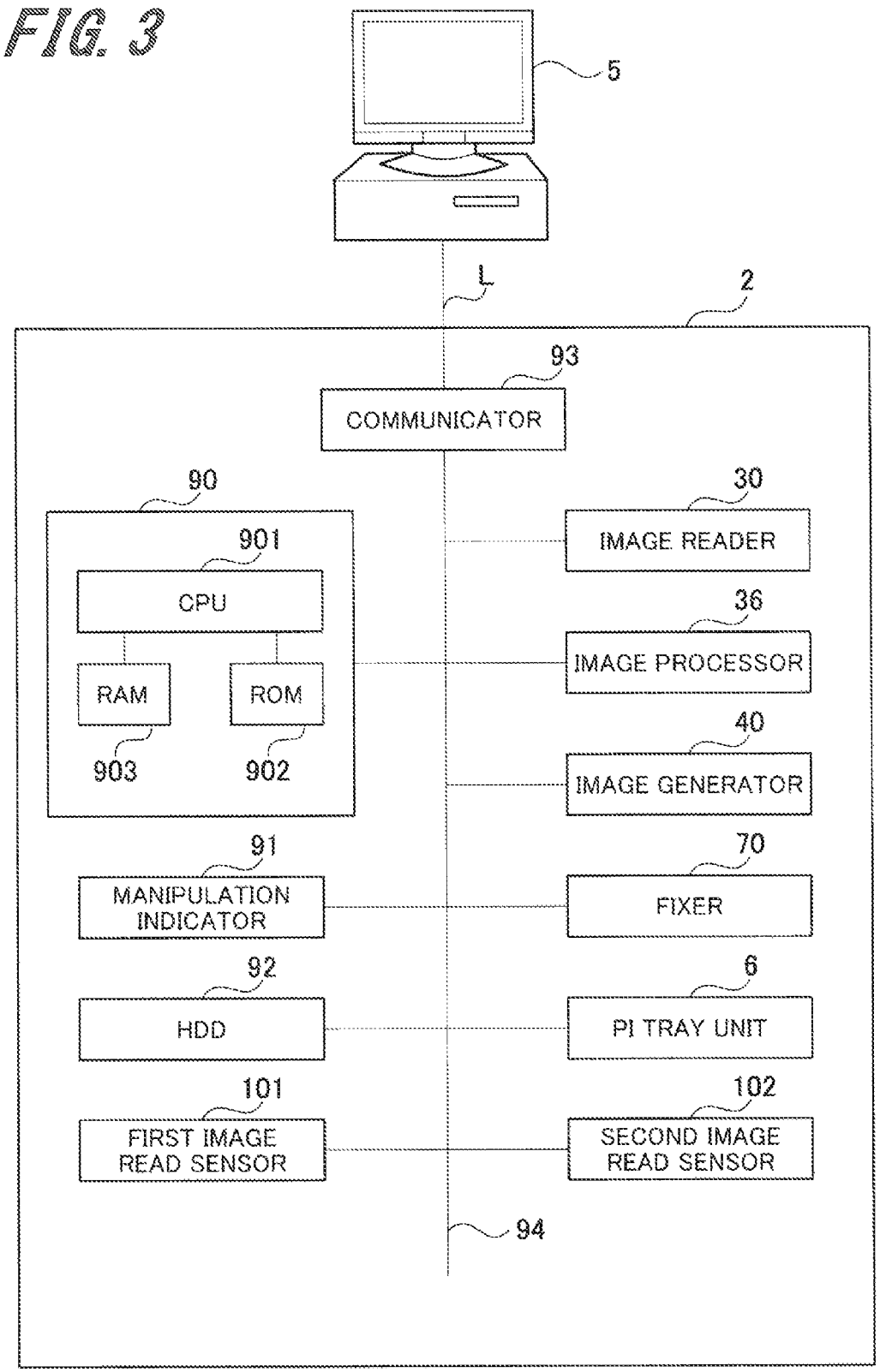
FIG. 3 is a block diagram illustrating a configuration of a control system in the image generator.

The description below explains a configuration of a control system for the image generator 1 with reference to FIG. 3. FIG. 3 is a block diagram illustrating the configuration of the control system in the image generator 1.

As illustrated in FIG. 3, the image generator 1 includes a controller 90. The controller 90 is configured over the control board 80 as illustrated in FIG. 2.

The controller 90 includes a CPU (Central Processing Unit) 901, ROM (Read Only Memory) 902 to store a program executed by the CPU 901, and RAM (Random Access Memory) 903 used as a work area for the CPU 901, for example. The ROM 902 is available as programmable ROM that can be erased electrically, for example.

The controller 90 is connected to the image reader 30, the image processor 36, the image generator 40, the fixer 70, the PI tray unit 6, a manipulation indicator 91, an HDD (Hard Disk Drive) 92, a communicator 93, the first image read sensor 101, and the second image read sensor 102 via a system bus 94 and controls the whole of the image generator 1.

Specifically, the image generator 1 performs the following operation and processing under control of the controller 90. The image reader 30 reads an image from document G or a document placed on the document rack 31 and generates image data. The image data generated by the image reader 30 or transmitted from an external apparatus connected to the image generator 1 is transmitted to the image processor 36. The image processor 36 applies image processing such as shading correction, image density adjustment, and image compression to the received image data as needed.

The image generator 40 forms a toner image on the interim transfer belt 50 based on the image data generated by the image reader 30 or the image data transmitted from the external apparatus. The secondary transferrer 60 transfers the toner image to paper S fed by the paper feeder 21. The fixer 70 presses and heats paper S to fix the toner image to paper S. The PI tray unit 6 delivers predetermined paper placed by a user to the paper path in the postprocessor 4.

The manipulation indicator 91 is provided as a touch panel, namely, a combination of a panel display apparatus such as a liquid crystal display (LCD) or an organic EL (Electro Luminescence) display apparatus and a position input apparatus such as a touch pad, for example. The manipulation indicator 91 displays an instruction menu for the user and information about the acquired image data. The manipulation indicator 91 also includes a plurality of keys and functions as an inputter to accept input of various instruction and data such as characters and numbers based on key manipulation by the user.

The HDD 92 is provided as an internal storage apparatus that stores image data about a document image read by the image reader 30 or stores already output image data. The communicator 93 receives job information transmitted through communication line L from a client PC 5 as an example of the external apparatus and delivers the received job information to the controller 90 via the system bus 94. The job information contains image data about an image to be formed and information such as the type of paper to be used and the number of sheets associated with the image data.

Suppose paper S is fed after printing (after image formation) via the fixer 70. In this case, the first image read sensor 101 reads an image on the first surface of paper S from under paper S, for example. The second image read sensor 102 reads an image on the second surface of paper S from above paper S, for example.

Waste Paper (Spoilage Paper)

In the image generator 1 configured as above, the fixer 70 may be chronologically contaminated by the toner or the toner may be transferred to the fixer 70 due to a jam of paper S. Paper S passing through this fixer 70 is treated as waste paper due to the contamination of the attached toner. Output paper S is also treated as waste paper depending on the degree of a misaligned image formation position or a chronologically varied image density in duplex printing.

An occurrence of this waste paper can be detected based on read results from the first image read sensor 101 and the second image read sensor 102 under control of the controller 90. Namely, the controller 90 has the function as a waste paper detector that detects the paper as waste paper based on read results from the first image read sensor 101 and the second image read sensor 102 when an image on the print surface of paper S is abnormal due to contamination of the transferred toner or an misaligned image formation position.

Specifically, the controller 90 compares image data read by the first image read sensor 101 and the second image read sensor 102 with image data for the document image stored in the HDD 92, for example. The controller 90 can detect an anomaly (defect) in the printed image by determining whether the printed image is normal or abnormal (unsuccessful). More specifically, the controller 90 determines whether the transferred toner contaminates the print surface or the duplex printing misaligns the image formation position or chronologically varies the image density.

Suppose a printed image is abnormal and the corresponding paper is detected to be waste paper. In this case, the controller 90 provides control to restart printing from a print job corresponding to the waste paper. Suppose normal-image paper is contained in sheets of paper output between detection of the waste paper and the reprint to be performed. In this case, the controller 90 provides control to use the normal-image paper as a printed matter. The detail will be described later.

The image generator 1 performs a recovery operation when the waste paper occurs under control of the controller 90. For example, the recovery operation stops the print job, requests the user to remove the waste paper, and restarts printing from the print job corresponding to the waste paper. During continuous printing to successively perform a plurality of print jobs, sheets of paper subsequent to the waste paper are also printed during a period in which the waste paper occurs and the job stops (reprinting). These sheets of paper are also ejected to the catch tray along with the waste paper.

When the waste paper is detected, the handling operation includes a stop pattern and a continuation pattern. The stop pattern stops the print job as above. The continuation pattern inserts partition paper to mark the waste paper after detection of the waste paper and continues printing from the print job corresponding to the waste paper. The description below specifically explains related-art examples of these patterns for the handling operation.

Stop Pattern

Figure 4:
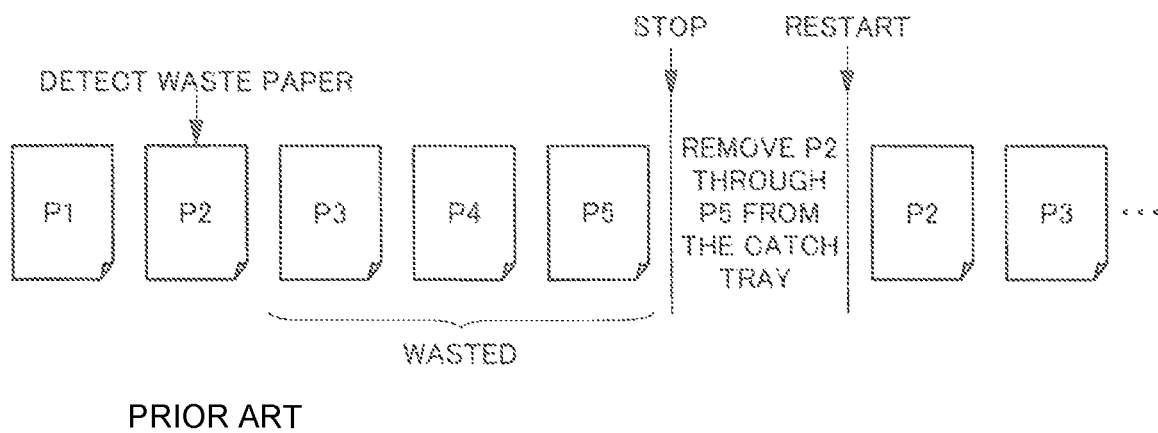
FIG. 4 is an explanatory diagram illustrating handling operation of a stop pattern according to a related-art example when waste paper is detected.

FIG. 4 is an explanatory diagram illustrating handling operation of the stop pattern according to a related-art example when waste paper is detected. For example, suppose second paper P2 is detected as waste paper. The stop pattern stops the print job after a predetermined time from the detection timing Printing is also performed on sheets of paper subsequent to waste paper P2, namely, three sheets of paper P3 through P5 in this example during a period from the detection timing for waste paper P2 to the job stop. The printed sheets are ejected to the catch tray unit 28.

When the print job stops, the manipulation indicator 91 displays a message notifying detection of the waste paper, for example. Receiving this message, the user removes waste paper P2 and subsequent contiguous paper P3 through P5 from the catch tray unit 28. The print job corresponding to the waste paper then restarts to perform the recovery operation. The recovery operation also reprints paper P3 through P5 subsequent to paper P2 for which the reprint is performed.

Namely, the recovery operation in response to the restart outputs the same printed matters as paper P3 through P5 ejected to the catch tray unit 28 when waste paper P2 is detected. The printed matters are redundantly output as paper P3 through P5 subsequent to paper P2 after the reprint. As a result, paper P3 through P5 may be useless if paper P3 through P5 ejected to the catch tray unit 28 are normally printed matters when waste paper P2 is detected. In other words, three sheets of paper P3 through P5 are consumed wastefully.

Continuation Pattern

Figure 5:
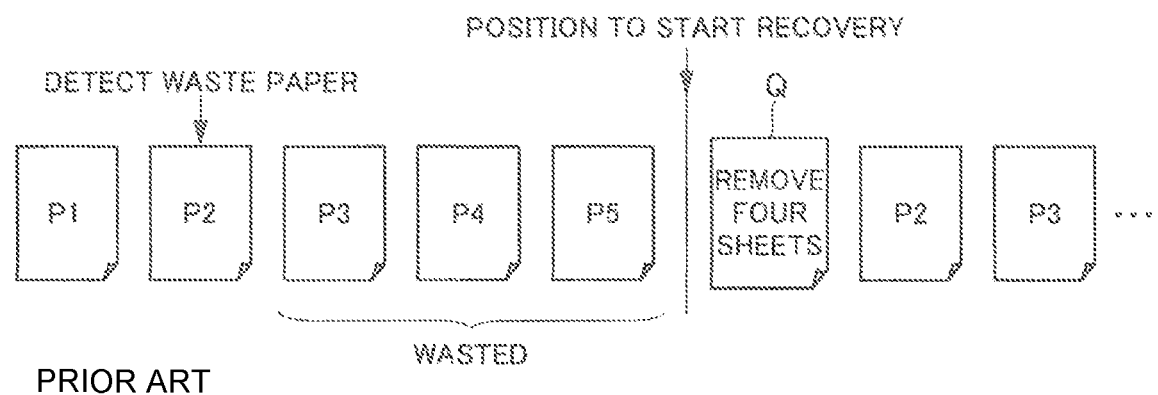
FIG. 5 is an explanatory diagram illustrating handling operation of a continuation pattern according to a related-art example when waste paper is detected.

FIG. 5 is an explanatory diagram illustrating handling operation of the continuation pattern according to a related-art example when waste paper is detected. When the second paper P2 is detected as waste paper, the continuation pattern performs the recovery operation from the print job corresponding to the waste paper after a predetermined time elapsed from the detection timing. At this time, partition paper Q is inserted before paper P2 for which the recovery operation is performed. Partition paper Q has the size larger than paper P2, for example. Partition paper Q is stored in one of paper containers 20 in the image generator body or one of paper feed trays in the paper feeder 2, for example.

Partition paper Q marks the waste paper and is ejected to the catch tray unit 28 after the image generator 40 prints the number of sheets of paper to be removed from the catch tray unit 28 before the print job for the waste paper restarts to reprint paper P2. After partition paper Q is inserted, the recovery operation is performed for reprint from the print job corresponding to the waste paper. The print is also performed on paper P3 through P5 subsequent to paper P2 for which the recovery operation is performed. The user removes the number of sheets (four sheets in this example) of paper P2 through P5 printed on partition paper Q from the catch tray unit 28 after completion of the continuous printing job, namely, the job to continuously perform a plurality of print jobs.

In the handling operation based on the continuation pattern according to the above-mentioned related-art example, the recovery operation after insertion of partition paper Q outputs the same printed matters as paper P3 through P5 ejected to the catch tray unit 28 when waste paper P2 is detected. The printed matters are redundantly output as paper P3 through P5 subsequent to paper P2 after the reprint. Similarly to the stop pattern, three sheets of paper P3 through P5 may be therefore useless if paper P3 through P5 ejected to the catch tray unit 28 are normally printed matters when waste paper P2 is detected.

The image generator 1 according to the present embodiment provides a recovery operation not to waste a normal printed matter (normal-image paper) if contained in sheets of paper output after an occurrence of waste paper, namely, paper output during a period from the occurrence of waste paper to the job stop (or the recovery operation restart). More specifically, the recovery operation according to the present embodiment enables a print job for the waste paper and disables a print job for a normal printed matter.

The description below explains specific working examples to provide the recovery operation according to the present embodiment. The recovery operation in each working example is performed under control of the controller 90 (see FIG. 3).

Example 1

Figure 6:
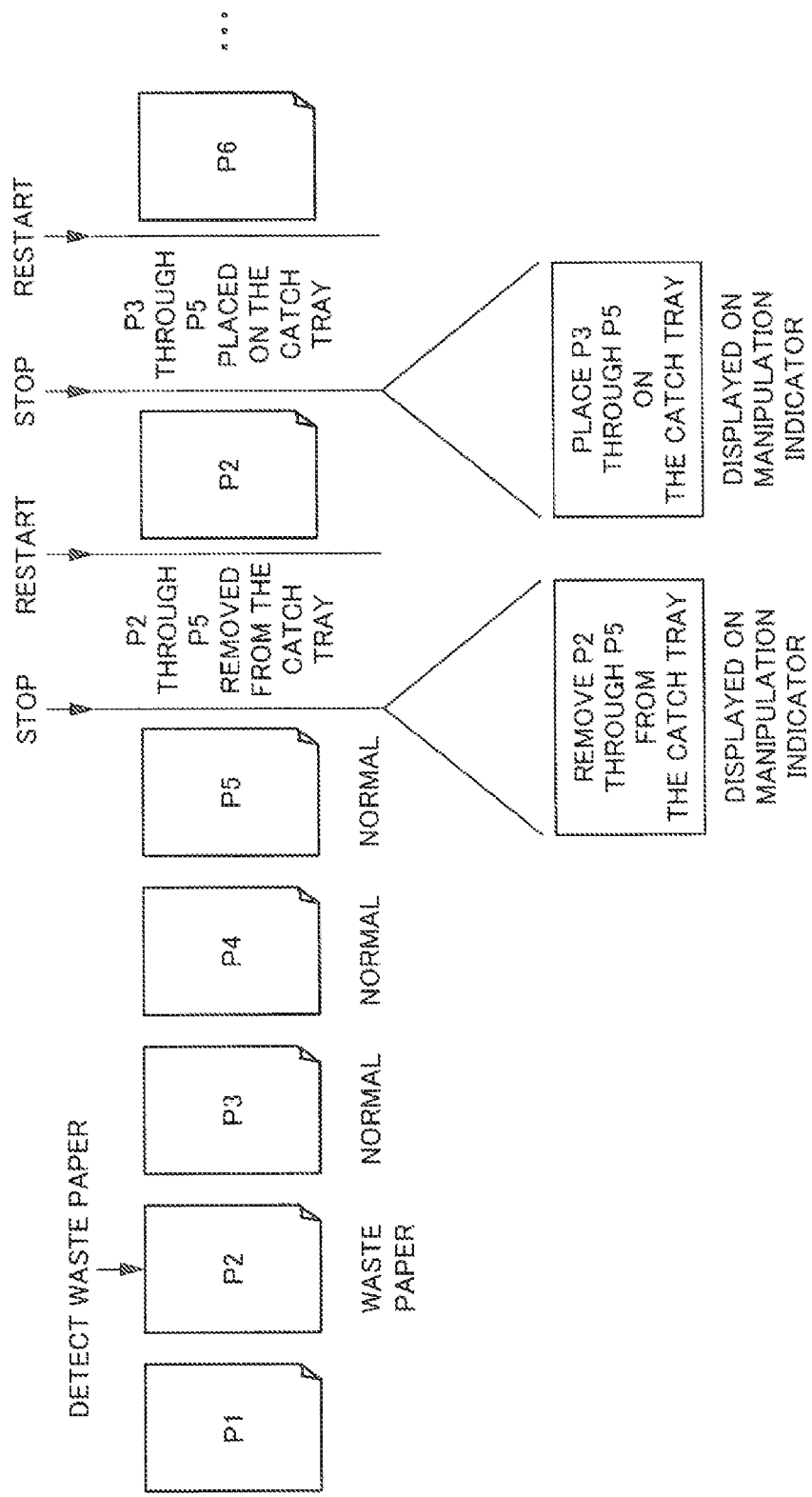
FIG. 6 is an explanatory diagram illustrating handling operation of a stop pattern according to Example 1 when waste paper is detected.

Example 1 provides a stop pattern example where the paper contiguous to or subsequent to the waste paper is normal-image paper (hereinafter also referred to as "normal paper"). FIG. 6 is an explanatory diagram illustrating handling operation of a stop pattern according to Example 1 when waste paper is detected. According to the example, the second paper P2 is detected as waste paper and three sheets of paper P3 through P5 subsequent to the waste paper are identified as normal paper. After the waste paper is detected, images on paper P3 through P5 are read to distinguish between normal paper (normal-image paper) and waste paper (paper printed with an abnormal image).

The number of sheets of paper output after detection of the waste paper, alternatively, the predetermined time/the number of pages from detection of the waste paper to the reprint (recovery operation), depends on the timing to detect the waste paper and a feed path distance from the paper container 20 or the paper feeder 2 (see FIG. 1 for both) in the image generator body to the image formation position. The same applies to the other working examples below.

Example 1 example detects the second paper P2 as waste paper, outputs three sheets of paper P3 through P5 as normal paper from the detection timing, and stops the print job. When the print job stops, the manipulation indicator 91 displays a message indicating "remove paper P2 through P5 from the catch tray," for example. In response to this message, the user removes waste paper P2 and subsequent paper P3 through P5 from the catch tray unit 28.

The user then presses a start button to restart the print job for the waste paper to be reprinted, output the waste paper as paper P2 to the catch tray unit 28, and stop the print job again. The manipulation indicator 91 displays a message indicating "place removed paper P3 through P5 on the catch tray," for example. In response to this message, the user places paper P3 through P5 except waste paper P2 out of already removed paper P2 through P5 on the catch tray unit 28 and presses the start button to restart. The continuous printing is then performed from paper P6 as usual.

The handling operation of the stop pattern according to above-mentioned Example 1 prevents the same printed matters as paper P3 through P5 ejected to the catch tray unit 28 at the time of detecting waste paper P2 from being redundantly printed as paper P3 through P5 subsequent to paper P2 after the recovery operation. Normal paper P3 through P5 can be therefore used (reused) as normal printed matters without being discarded. It is possible to avoid three sheets of paper P3 through P5 from being consumed wastefully.

Example 2

Figure 7:
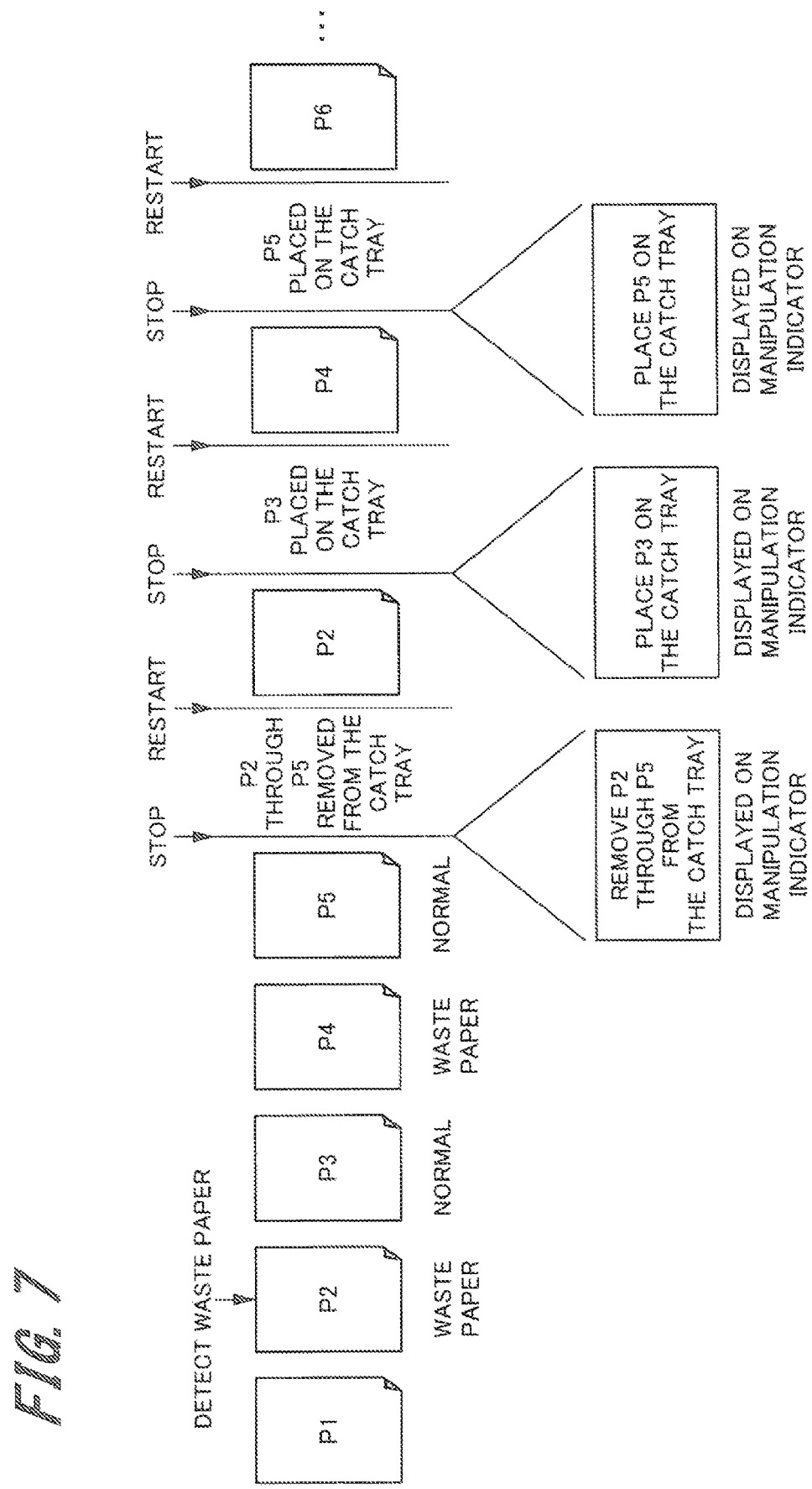
FIG. 7 is an explanatory diagram illustrating handling operation of a stop pattern according to Example 2 when waste paper is detected.

Example 2 provides a stop pattern example where waste paper and normal paper are mixed in the paper subsequent to the waste paper. FIG. 7 is an explanatory diagram illustrating handling operation of the stop pattern according to Example 2 when waste paper is detected. According to the example, the second paper P2 is detected as waste paper followed by three sheets of paper P3 through P5. The third paper P3 is identified as normal paper. The fourth paper P4 is identified as waste paper. The fifth paper P5 is identified as normal paper.

In Example 2, paper P2 is detected as the waste paper. Paper P3 is output as normal paper. Paper P4 is output as waste paper. Paper P5 is output as normal paper. Then, the print job stops. At this time, the manipulation indicator 91 displays a message indicating "remove paper P2 through P5 from the catch tray," for example. In response to this message, the user removes waste paper P2 and subsequent paper P3 through P5 from the catch tray unit 28.

The user then presses a start button to restart the print job for the waste paper to be reprinted. The waste paper as paper P2 is ejected to the catch tray unit 28. The print job stops again. At this time, the manipulation indicator 91 displays a message indicating "place removed paper P3 on the catch tray," for example. In response to this message, the user places paper P3 as normal paper out of already removed paper P2 through P5 on the catch tray unit 28 and presses the start button to restart.

The restart for reprint ejects paper P4 to the catch tray unit 28. Then, the print job stops again. At this time, the manipulation indicator 91 displays a message indicating "place removed paper P5 on the catch tray," for example. In response to this message, the user places paper P5 as already removed normal paper on the catch tray unit 28 and presses the start button to restart. The continuous printing is then performed from paper P6 as usual.

The handling operation of the stop pattern according to above-mentioned Example 2 uses the repetition of the reprint and the placement of normal paper by the user to sequentially eject paper P1 followed by paper P2 through P5 as normal paper after the waste paper detection to the catch tray unit 28. In addition, the recovery operation does not redundantly output the same printed matters as normal paper P3 and P5 ejected to the catch tray unit 28 when waste paper P2 is detected. Normal paper P3 and P5 can be therefore used (reused) as normal printed matters without being discarded. It is possible to avoid two sheets of paper P3 and P5 from being consumed wastefully.

Example 3

Figure 8:
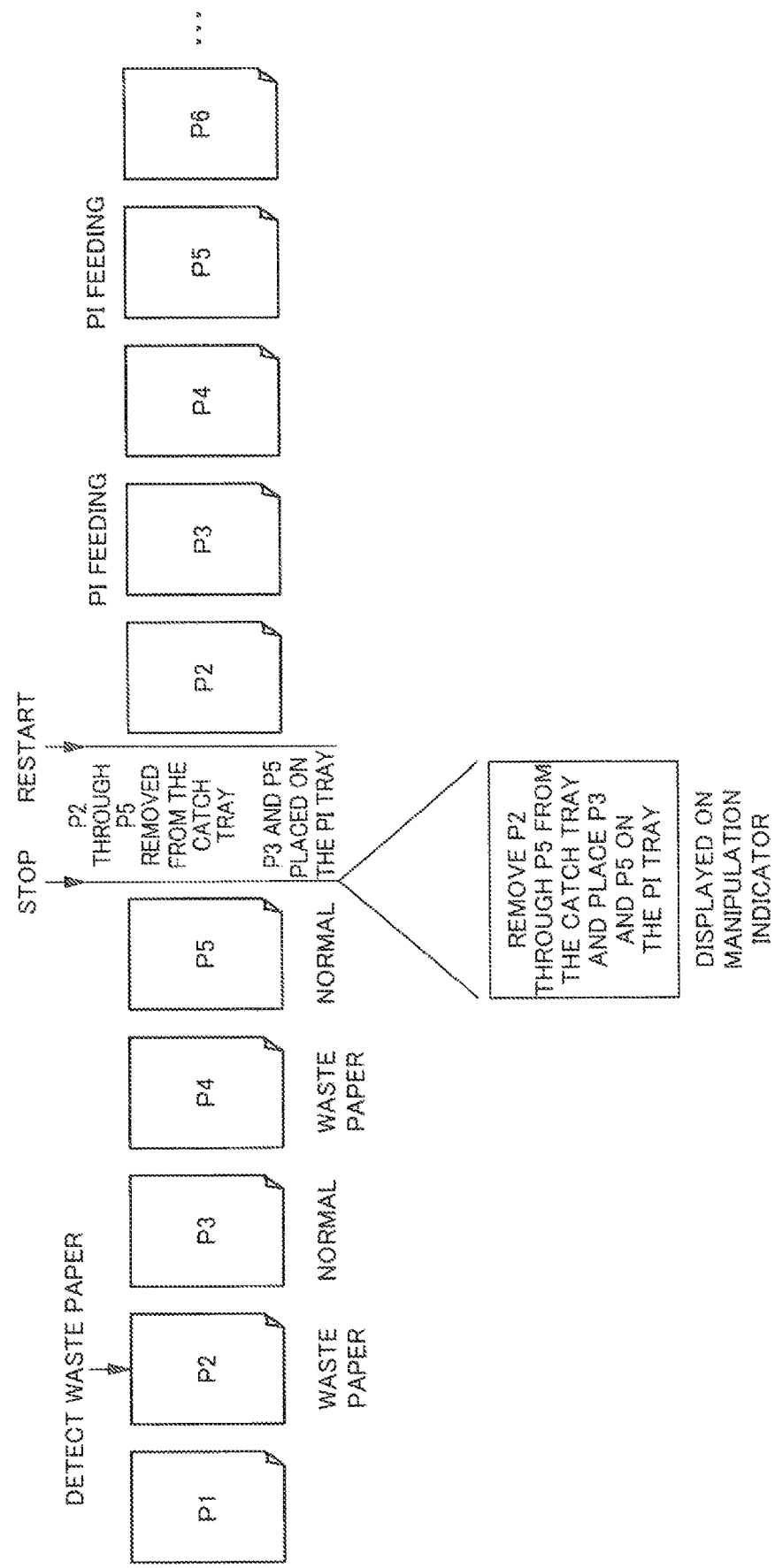
FIG. 8 is an explanatory diagram illustrating handling operation of a stop pattern according to Example 3 when waste paper is detected.

Similarly to Example 2, Example 3 provides a stop pattern example where waste paper and normal paper are mixed in the paper subsequent to the waste paper. FIG. 8 is an explanatory diagram illustrating handling operation of the stop pattern according to Example 3 when waste paper is detected. According to the example, the second paper P2 is also detected as waste paper followed by three sheets of paper P3 through P5. The third paper P3 is identified as normal paper. The fourth paper P4 is identified as waste paper. The fifth paper P5 is identified as normal paper.

In Example 3, paper P2 is detected as the waste paper. Paper P3 is output as normal paper. Paper P4 is output as waste paper. Paper P5 is output as normal paper. Then, the print job stops. At this time, the manipulation indicator 91 displays a message indicating "remove paper P2 through P5 from the catch tray and place paper P3 and P5 on the PI tray," for example. In response to this message, the user removes waste paper P2 and subsequent paper P3 through P5 from the catch tray unit 28, places paper P3 and P5 as normal paper on the PI tray unit 6, and then presses the start button to restart.

The reprint then outputs paper P2. The paper feed from the PI tray unit 6 outputs paper P3 as normal paper. The reprint then outputs paper P4. The paper feed from the PI tray unit 6 outputs paper P5 as normal paper. The continuous printing is then performed from paper P6 as usual. A sequence of these handling operations is performed under control of the controller 90.

The handling operation of the stop pattern according to above-mentioned Example 3 uses the repetition of the reprint and the paper feed from the PI tray unit 6 to sequentially eject paper P1 followed by paper P2 through P5 as normal paper after the waste paper detection to the catch tray unit 28. In addition, the recovery operation does not redundantly output the same printed matters as normal paper P3 and P5 ejected to the catch tray unit 28 when waste paper P2 is detected. Normal paper P3 and P5 can be therefore used (reused) as normal printed matters without being discarded. It is possible to avoid two sheets of paper P3 and P5 from being consumed wastefully.

Example 4

Figure 9:
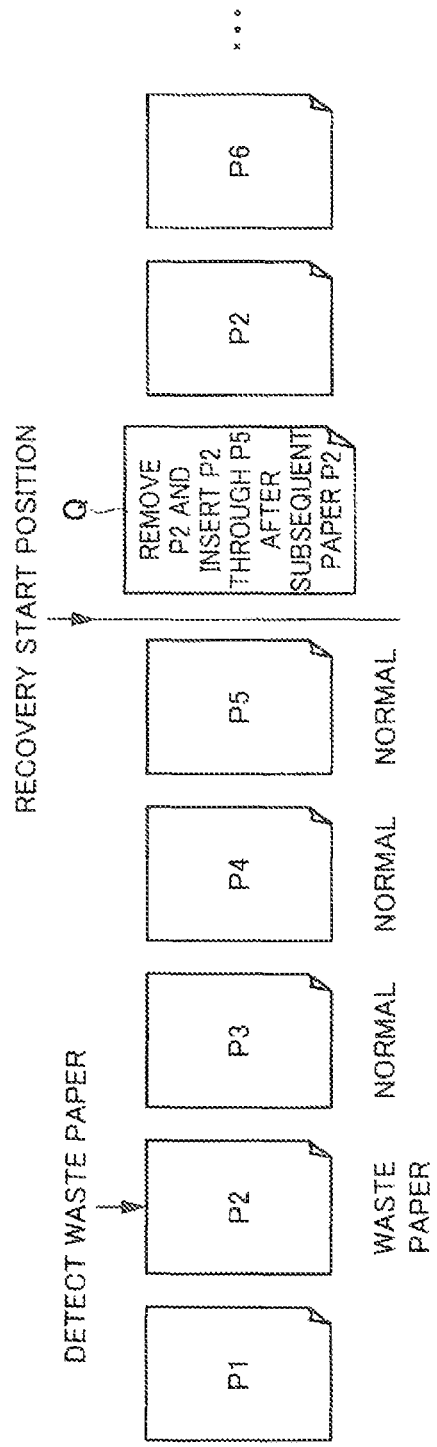
FIG. 9 is an explanatory diagram illustrating handling operation of a continuation pattern according to Example 4 when waste paper is detected.

Example 4 provides a continuation pattern example where waste paper is followed by normal paper. FIG. 9 is an explanatory diagram illustrating handling operation of the continuation pattern according to Example 4 when waste paper is detected. Similarly to Example 1, the second paper P2 is detected as waste paper followed by three sheets of paper P3 through P5 as normal paper (normal-image paper).

Example 4 detects the second paper P2 as waste paper. The print job for the waste paper restarts (recovery operation) after a predetermined time elapsed from the detection. At this time, partition paper Q is inserted to mark the waste paper before paper P2 to be reprinted (namely, after normal paper P5). Partition paper Q has the size larger than paper P2, for example. Partition paper Q is printed with the content notifying the user of the paper (waste paper P2) to be removed from the catch tray unit 28 and paper pages (normal paper P3 through P5) to be inserted. The printed content provides a message such as "remove paper P2 from the catch tray and insert paper P3 through P5 after subsequent paper P2."

Insertion of partition paper Q is followed by the reprint to output paper P2. The continuous printing is then performed from paper P6 as usual. After the continuous printing terminates, the user performs operation such as finding partition paper Q to locate the position of waste paper P2, removing waste paper P2 by following the message printed on partition paper Q, and inserting normal paper P3 through P5 after reprinted paper P2. Normal paper P3 through P5 are found between waste paper P2 and partition paper Q.

The handling operation of the continuation pattern according to above-mentioned Example 4 can remove only the waste paper if any. This is because partition paper Q is inserted during the recovery operation to explicitly indicate the position of the waste paper, a message is used to notify the user of the position to insert the normal paper, and only the print job for the waste paper is performed for reprint. Namely, the handling operation prevents the same printed matters as paper P3 through P5 ejected to the catch tray unit 28 at the time of detecting waste paper P2 from being redundantly printed as paper P3 through P5 subsequent to paper P2 after the recovery operation. Normal paper P3 through P5 can be therefore used (reused) as normal printed matters without being discarded. It is possible to avoid three sheets of paper P3 through P5 from being consumed wastefully.

According to Example 4, partition paper Q to be inserted as a mark for the waste paper is used to print the paper to be removed from the catch tray unit 28 and the content notifying a paper page to be inserted. However, partition paper Q may be used to print an image of the paper to be removed, for example.

Example 5

Figure 10:
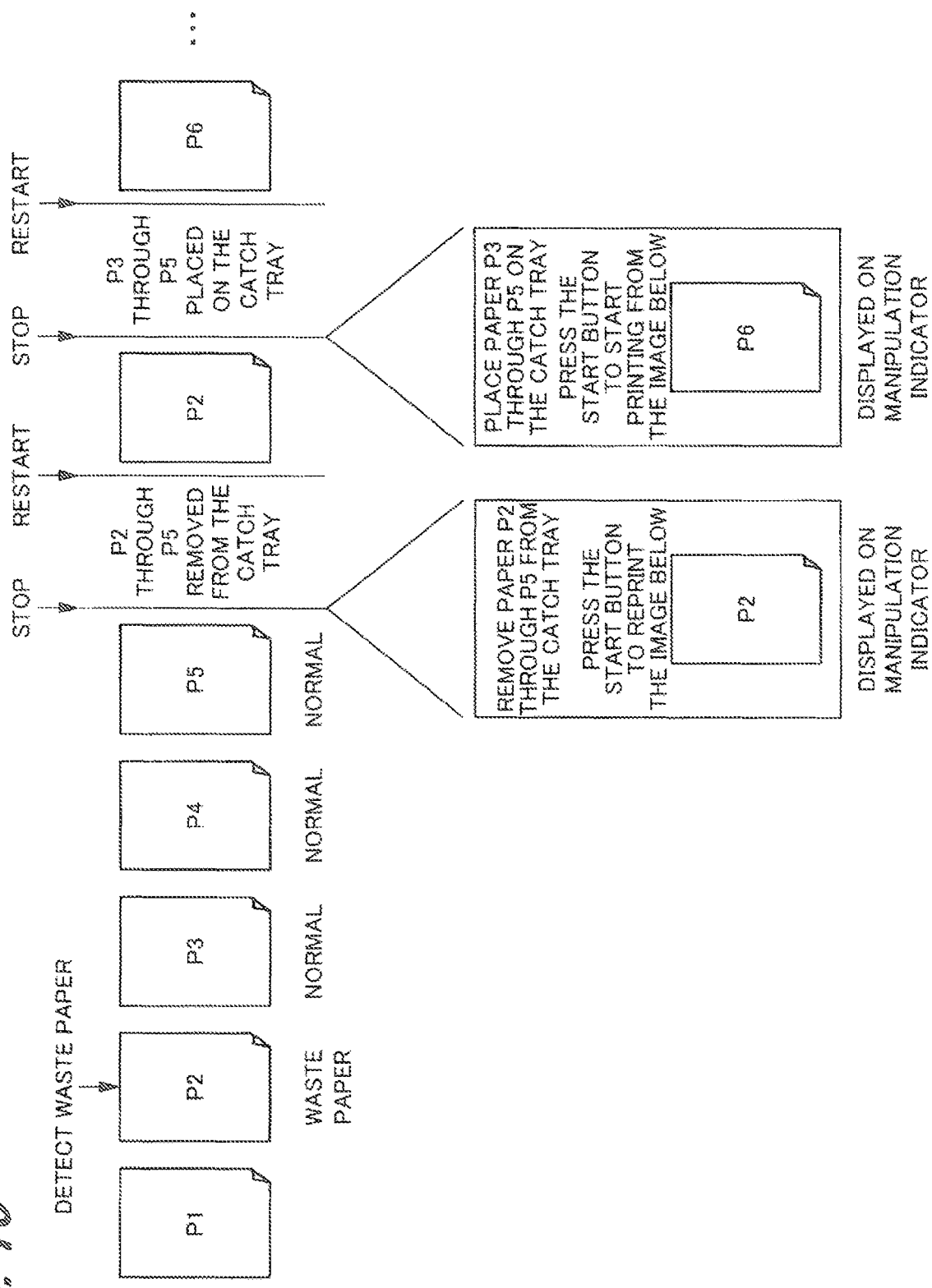
FIG. 10 is an explanatory diagram illustrating handling operation of a stop pattern according to Example 5 when waste paper is detected.

Example 5 provides a stop pattern of the waste paper followed by the normal paper and uses a thumbnail to indicate the paper to be removed. FIG. 10 is an explanatory diagram illustrating handling operation of the stop pattern according to Example 5 when waste paper is detected.

Example 5 detects the waste paper at the second paper P2, outputs three sheets of paper P3 through P5 as normal paper from the detection timing, and then stops the print job. When the print job stops, the manipulation indicator 91 displays a message such as "Remove paper P2 through P5 from the catch tray. Press the start button to reprint the image below." and a thumbnail image for the paper P2 to be removed from the catch tray unit 28.

The thumbnail image may be displayed on paper P2 by using image data read by the first image read sensor 101 and the second image read sensor 102 or image data stored in the HDD 92 before printout.

In response to the display on the manipulation indicator 91, the user removes waste paper P2 and subsequent paper P3 through P5 from the catch tray unit 28. The user then presses the start button to restart the print job corresponding to the waste paper for reprint. The waste paper is ejected as paper P2 to the catch tray unit 28. The print job then stops again.

The manipulation indicator 91 displays the thumbnail image of paper P6 along with a message such as "Place paper P3 through P5 on the catch tray. Press the start button to start printing from the image below." In response to this display, the user places paper P3 through P5 on the catch tray unit 28, namely, out of the already removed paper P2 through P5 except waste paper P2, and presses the start button to restart. The continuous printing is then performed from paper P6 as usual.

The handling operation of the stop pattern according to above-mentioned Example 5 can provide the same behavior and effect as Example 1. Namely, the handling operation prevents the same printed matters as paper P3 through P5 ejected to the catch tray unit 28 at the time of detecting waste paper P2 from being redundantly printed as paper P3 through P5 subsequent to paper P2 after the recovery operation. Normal paper P3 through P5 can be therefore used (reused) as normal printed matters without being discarded. It is possible to avoid three sheets of paper P3 through P5 from being consumed wastefully.

The handling operation of the stop pattern according to above-mentioned Example 5 moreover allows the manipulation indicator 91 to display the thumbnail image for waste paper P2 to be removed from the catch tray unit 28 along with a message. The user can visually identify the paper to be removed from the catch tray unit 28. It is possible to prevent inadvertent operation by the user.

Example 6

Figure 11:
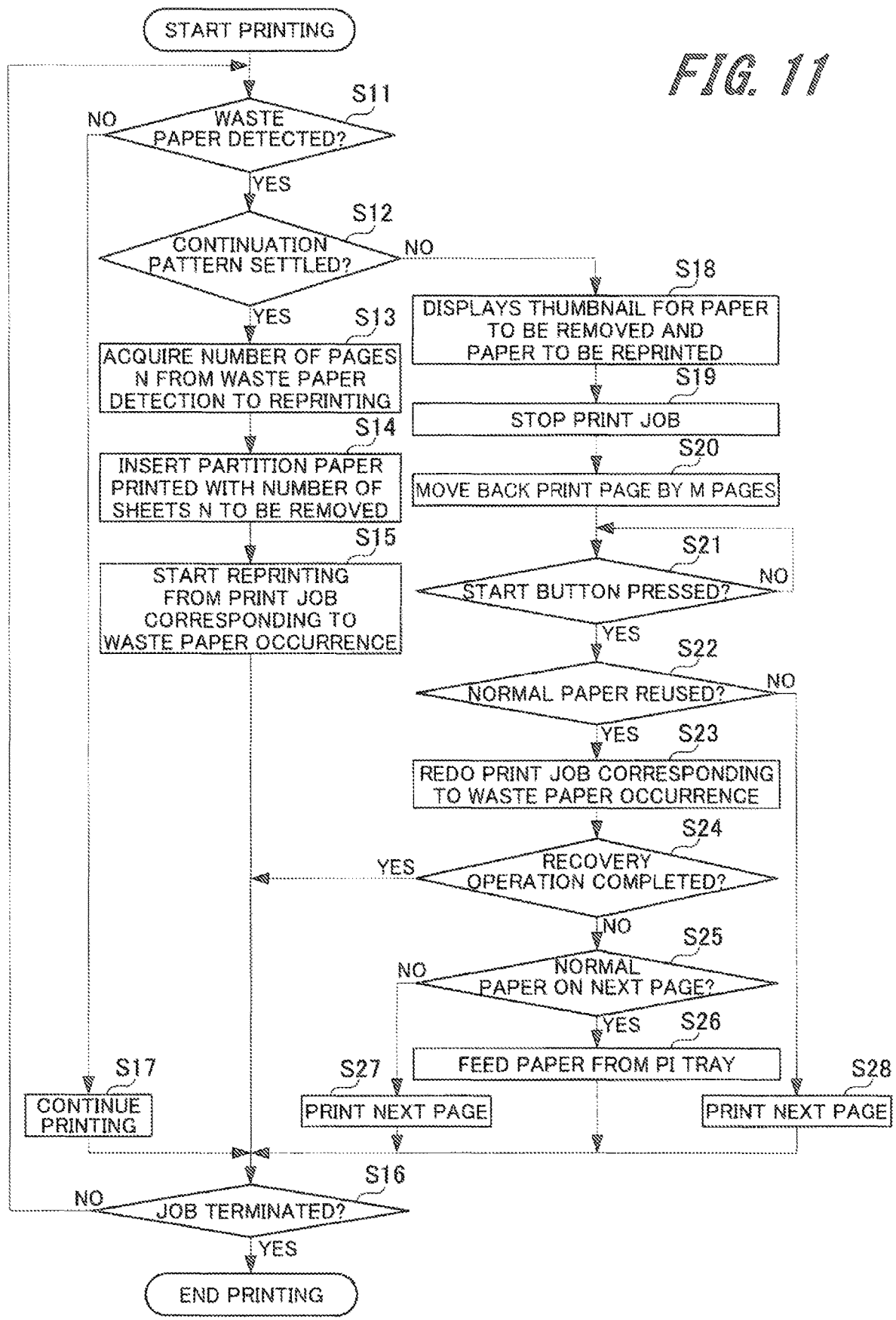
FIG. 11 is a flowchart illustrating a control flow of an image generation method according to Example 6.

Example 6 provides an image generation method of allowing the image generator 1 according to the present embodiment to implement the handling operations described in Example 1 through Example 5 as above. FIG. 11 is a flowchart illustrating a control flow of an image generation method according to Example 6. A sequence of processes according to this flowchart is performed under control of the controller 90 (more specifically, the CPU 901).

When the print operation starts, the controller 90 determines whether the waste paper is detected (step S11). If the waste paper is detected (YES at S11), the process determines whether a continuation pattern is settled (step S12). If the continuation pattern is settled (YES at S12), the controller 90 acquires the number of sheets (the number of pages) N of paper output between detection of the waste paper and the reprint to be performed (step S13). The process inserts partition paper Q as a mark for the waste paper (step S14). Partition paper Q is printed with the number of sheets N of the paper as the number of sheets N to be removed. The process starts the reprint from the print job for the waste paper (step S15).

After the reprint starts, the controller 90 determines whether a continuous printing job to successively print a plurality of print jobs terminates (step S16). If the job does not terminate (NO at S16), the process returns to step S11. If the job terminates (YES at S16), the process terminates the sequence of processes to form (print) images.

If no waste paper is detected at step S11 (NO at S11), the controller 90 continues the print operation (step S17). The process proceeds to step S16 and determines whether the continuous printing job terminates.

The continuation pattern may not be settled at step S12 (NO at S12). In this case, the stop pattern is settled. The controller 90 displays a thumbnail image for the paper to be removed from the catch tray unit 28 and the paper to be reprinted (step S18). The process then stops the print job (step S19).

The controller 90 moves back the print page by M pages (step S20) and waits until a user presses the start button (step S21). If the start button is pressed (YES at S21), the process determines whether the normal paper is reused, namely, the normal paper is used as a normal printed matter (step S22). If the normal paper is reused (YES at S22), the controller 90 redoes the print job for the waste paper (step S23).

The controller 90 determines whether the recovery operation due to the waste paper detection is completed, namely the M pages moved back at step S20 are printed completed (step S24). If the recovery operation is completed (YES at S24), the process proceeds to step S16 and determines whether the continuous printing job terminates.

If the recovery operation is not completed (NO at S24), the controller 90 determines whether the next page is normal paper (step S25). If the next page is normal paper (YES at S25), the process feeds the paper from PI tray unit 6 (step S26). If the next page is not normal paper (NO at S25), the process prints the next page (step S27). After the processing at step S26 and step S27, the process proceeds to step S16 and determines whether the continuous printing job terminates.

The normal paper may not be reused according to the determination at step S22 (NO at S22). In this case, the controller 90 prints the next page (step S28), and then proceeds to step S16 to determine whether the continuous printing job terminates.

Modification

While there has been described the present invention using the embodiments, the present invention is not limited to the scope of the above-mentioned embodiments. Various changes or improvements may be added to the above-mentioned embodiments without departing from the spirit and scope of the present invention. The changed or improved embodiments are also included in the technical scope of the present invention.

For example, the above-mentioned embodiments have described the copier as an example of the image generator 1 according to an embodiment of the present invention, but are not limited to this example of application. Namely, the present invention is applicable to electrophotographic image generators in general such as copiers, printers, facsimile machines, printing machines, and combined machines.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image generator, 2 . . . paper feeder, 3 . . . image reader, 4 . . . postprocessor, 5 . . . external apparatus, 6 . . . PI tray unit, 10 . . . document transporter, 20 . . . paper container, 30 . . . image reader, 40 . . . image generator, 50 . . . interim transfer belt, 60 . . . secondary transferrer, 70 . . . fixer, 90 . . . controller, 91 . . . manipulation indicator, 100 . . . image generation system, 101 . . . first image read sensor, 102 . . . second image read sensor

What is claimed is:

1. An image generation system comprising:
an image generator configured to generate, based on a print job, a first image on a first recording medium and a second image on a second recording medium following the first recording medium;
an image read sensor configured to read the first image on the first recording medium and the second image on the second recording medium where the first and second images are respectively formed by the image generator; and
a controller configured to control the image generator to stop the print job at a time based on a detection of an abnormal image regardless of a pattern of recording medium having abnormal images, when the first image on the first recording medium is the abnormal image based on a read result by the image read sensor during execution of the print job in which all recording media are output to a same sheet-output tray,
wherein the controller is further configured to control the image read sensor to read the second image on the second recording medium regardless of a pattern of recording medium having abnormal images, and wherein the first and second recording media are ejected to the same sheet-output tray.

2. The image generation system according to claim 1, wherein, the controller is configured to stop initiating processing of any new sheets after the abnormal image is detected.

3. The image generation system according to claim 1, wherein, the controller is configured to provide control to feed, to the tray, the first recording medium on which the image is determined to be the abnormal image and the second recording medium subsequent to the first recording medium on which the image is determined to be the abnormal image when the abnormal image is detected.

4. The image generation system according to claim 1, wherein, when the abnormal image is detected, the controller is configured to provide control to perform reprint for the first image which is determined to be the abnormal image, according to an instruction by a user after stopping initiating processing of any new sheets.

5. The image generation system according to claim 4, wherein the controller is configured to provide control to display the first image, which is determined to be the abnormal image.

6. The image generation system according to claim 1, wherein the controller is configured to prompt a user to remove the first recording medium on which the first image is determined to be the abnormal image from the tray.

7. The image generation system according to claim 1, further comprising:
a detector configured to determine that the first image on the recording medium is the abnormal image.

8. An image generation method for an image generation system including an image generator that generates, based on a print job, a first image on a first recording medium and a second image on a second recording medium following the first recording medium, and an image read sensor that reads the first image on the first recording medium and the second image on the second recording medium where the first and second images are respectively formed by the image generator, the method comprising:
controlling the image generator to stop the print job at a time based on a detection of an abnormal image regardless of a pattern of recording medium having abnormal images, when the first image on the first recording medium is the abnormal image based on a read result by the image read sensor during execution of the print job in which all recording media are output to a same sheet-output tray;
controlling the image read sensor to consecutively read the second image on the second recording medium regardless of a pattern of recording medium having abnormal images; and
ejecting the first and second recording media to the same sheet-output tray.

9. An image generation system comprising:
an image generator configured to generate an image on a recording medium based on a print job in which all recording media, including the recording medium, are to be output to a same sheet-output tray;
an image read sensor configured to read the image on the recording medium in the print job; and
a controller configured to perform regardless of a pattern of recording medium having abnormal images after the image read by the image read sensor has been determined to be an abnormal image:
  when in a first mode, a control of continuing the determination of images on recording media following the recording medium on which the image is determined to be the abnormal image without stopping the print job;
  when in a second mode, a control of stopping the determination of images on the recording media before an end of the print job; and
  a control of displaying the image determined to be the abnormal image on a display.

10. The image generation system according to claim 9, wherein
  the image read sensor includes a first image read sensor configured to read a first image on a first surface of the recording medium and a second image read sensor configured to read a second image on a second surface of the recording medium.

11. The image generation system according to claim 10, wherein
  the first image read sensor is configured to read the first image from under the recording medium, and the second image read sensor is configured to read the second image from above the recording medium.

12. The image generation system according to claim 10, wherein
  light-sensitive elements are positioned across a maximum width of the recording medium in the first image read sensor and the second image read sensor.

13. The image generation system according to claim 11, wherein
  the second image read sensor is placed downstream of the first image read sensor in a transport direction of the recording medium.

14. The image generation system according to claim 9, wherein
  the controller is configured such that the controller performs a control to stop the print job at a time based on the determination of the abnormal image in the second mode.

15. The image generation system according to claim 9, wherein
  the controller is configured to perform reprint for the image which is determined to be the abnormal image according to an instruction by a user after the print job is stopped based on the determination of the abnormal image.

16. The image generation system according to claim 9, further comprising:
  a detector configured to determine that the image read by the image read sensor is an abnormal image.

17. An image generation method for an image generation system including an image read sensor configured to read an image on a recording medium, the method comprising:
  determining that the image on the recording medium is an abnormal image in a print job in which all recording media, including the recording medium, are to be output to a same sheet-output tray; and
  executing regardless of a pattern of recording medium having abnormal images, after the image read by the image read sensor has been determined to be an abnormal image:
    when in a first mode, a control of continuing the determination of images on recording media following the recording medium on which the image is determined to be the abnormal image without stopping the print job;
    when in a second mode, a control of stopping the determination of images on the recording media before an end of the print job; and
    a control of displaying the image detected as being the abnormal image on a display.

18. A non-transitory recording medium storing a computer readable program for causing a hardware processor in an image generation system including an image read sensor configured to read an image on a recording medium to:
  determine that the image on the recording medium is an abnormal image in a print job in which all recording media, including the recording medium, are to be output to a same sheet-output tray; and
  execute regardless of a pattern of the recording medium having abnormal images after the image read by the image read sensor has been determined to be an abnormal image:
    when in a first mode, a control of continuing the determination of images on recording media following the recording medium on which the image is determined to be the abnormal image without stopping the print job;
    when in a second mode, a control of stopping the determination of images on the recording media before an end of the print job; and
    a control of displaying the image detected as being the abnormal image on a display.

19. An image generation system comprising:
  an image generator configured to generate an image on a recording medium based on a print job in which all recording media, including the recording medium, are to be output to a same sheet-output tray;
  an image read sensor configured to read the image on the recording medium in the print job; and
  a controller configured to perform without judgement of a pattern of recording medium having abnormal images after the image read by the image read sensor has been determined to be an abnormal image:
    when in a first mode, a control of continuing the determination of images on recording media following the recording medium on which the image is determined to be the abnormal image without stopping the print job;
    when in a second mode, a control of stopping the determination of images on the recording media before an end of the print job; and
    a control of displaying the image determined to be the abnormal image on a display.

20. An image generation method for an image generation system including an image read sensor configured to read an image on a recording medium, the method comprising:
  determining that the image on the recording medium is an abnormal image in a print job in which all recording media, including the recording medium, are to be output to a same sheet-output tray; and
  executing without judgement of a pattern of recording medium having abnormal images after the image read by the image read sensor has been determined to be an abnormal image:
    when in a first mode, a control of continuing the determination of images on recording media following the recording medium on which the image is determined to be the abnormal image without stopping the print job;

when in a second mode, a control of stopping the determination of images on the recording media before an end of the print job; and a control of displaying the image detected as being the abnormal image on a display.

21. A non-transitory recording medium storing a computer readable program for causing a hardware processor in an image generation system including an image read sensor configured to read an image on a recording medium to:

determine that the image on the recording medium is an abnormal image in a print job in which all recording media, including the recording medium, are to be output to a same sheet-output tray; and execute without judgement of a pattern of recording medium having abnormal images after the image read by the image read sensor has been determined to be an abnormal image:

when in a first mode, a control of continuing the determination of images on recording media following the recording medium on which the image is determined to be the abnormal image without stopping the print job;

when in a second mode, a control of stopping the determination of images on the recording media before an end of the print job; and a control of displaying the image detected as being the abnormal image on a display.

* * * * *